United States Patent [19]
Sukurs et al.

[11] 3,972,405
[45] Aug. 3, 1976

[54] RELOADING DEVICE

[75] Inventors: Raimonds Sukurs, Rheinhausen; Hans Kemper, Rheydt-Odenkirchen, both of Germany

[73] Assignee: Fried. Krupp Gesellschaft mit beschrankter Haftung, Essen, Germany

[22] Filed: June 19, 1974

[21] Appl. No.: 480,885

[30] Foreign Application Priority Data
June 22, 1973 Germany............................ 2331631

[52] U.S. Cl...................................... 198/9; 37/190; 198/36; 198/233
[51] Int. Cl.²......................................... B65G 65/16
[58] Field of Search ............. 198/7 R, 8, 9, 36, 233; 37/190, DIG. 20

[56] References Cited
UNITED STATES PATENTS
3,285,385   11/1966   Langner.................................. 198/9
FOREIGN PATENTS OR APPLICATIONS
1,092,408   11/1967   United Kingdom..................... 198/9

*Primary Examiner*—Evon C. Blunk
*Assistant Examiner*—Jeffrey V. Nase
*Attorney, Agent, or Firm*—Walter Becker

[57] ABSTRACT

A reloading device, e.g. a combined reloading — loading device, which on one hand so rests on a transfer device movable above a storage place conveyor that the transfer device can carry out pivotal movements about a vertical axis and an axis transverse to the belt bridge axis while being prevented from carrying out longitudinal movements, and on the other hand rests on a carriage by the aid of rocker means which is equipped with rollers as support for supporting rails mounted on the belt bridge and extending approximately in the longitudinal direction of the belt bridge. The supporting rails are mounted on the belt bridge for pivoting about an axis transverse to the longitudinal axis of the belt bridge and are arrestable relative to the belt bridge at such inclinations that the reaction force component acting approximately in the longitudinal direction of the belt bridge and originating in the pick-up means is at least partially transformed onto the carriage.

3 Claims, 11 Drawing Figures

RELOADING DEVICE

The present invention relates to a reloading device. British Pat. No. 1,092,408 discloses a reloading device which has a pickup device in the form of a bucket wheel which is mounted on a belt bridge. That end of said belt bridge which faces away from the bucket wheel rests on a transfer device which is movable above a storage place conveyor, and near and behind the bucket wheel rests on a carriage movable on the storage place. The support or resting on the transfer device is so effected that the belt bridge rests in joints arranged on both sides of a pouring funnel and having a horizontal axis transverse to the longitudinal direction of the bridge. These joints are mounted on a supporting ring which is mounted on a gate-like structure of the transfer device by means of a ball ring so as to be rotatable about a vertical axis. The support of the belt bridge near and behind the bucket wheel is effected by means of two supporting rails which are located at the lower chord of the belt bridge and which respectively rest on a pair of rollers provided in a rocker, said rocker resting on the frame of the carriage in a one-point joint. The pourable goods, for instance, ore, which the bucket wheel picks up from the foot of a dump is, by means of a reloading belt mounted in the belt bridge, conveyed to a depositing station above the supporting ring of the transfer device and through a pouring funnel in the supporting ring and the gate drops upon the conveyor belt of a storage place.

When the bucket wheel picks pourable material off the dump, the belt bridge must absorb reaction forces which have strong components acting in the longitudinal direction of the bridge. The nearly horizontal force components are absorbed in the above mentioned joints on the supporting ring of the transfer device. These forces which can be considerable exert tilting moments upon the transfer device. These tilting moments have the tendency to tilt over the gate-shaped understructure of the transfer device, said understructure moving on rails, so that expensive countersteps have to be taken, for instance, a corresponding wide rail gauge has to be employed. Moreover, due to the above mentioned tilting moments, the turntable, be means of which the supporting ring is mounted on the understructure of the transfer device, is subjected unilaterally to stresses whereby its life span is reduced unless a particularly strong and expensive design is selected for the turntable.

It is, therefore, an object of the present invention to provide a reloading device which will overcome the above mentioned drawbacks.

This object and other objects and advantages of the invention will appear more clearly from the following specification, in connection with the accompanying drawings, in which.

The reloading device according to the present invention is characterized primarily in that the supporting rails on the belt bridge are pivotable about an axis which is arranged transverse to the longitudinal direction of the band bridge while said supporting rails are adapted to be set at such inclinations relative to the belt bridge that the component of the reaction force respectively emanating from the receiving device is at least partially transferred to the carriage.

Thus, according to the invention the above mentioned tilting moments which act upon the transfer device are avoided at least to a major extent because the carriage which moves on the storage place and is located closely behind the pickup device is taken advantage of for absorbing the respective reaction forces of the pickup device.

As pickup device of the reloading device, a bucket wheel may be employed in conformity with the invention. However, also other pickup devices such as bucket chains, scraper devices, etc., may be used. The invention may be also employed with a combined reloading and loading device which comprises a separate loading belt and the reloading belt of which is reversible and liftable so that it can also serve as loading belt.

Referring now to the drawings in detail, the arrangement illustrated therein comprises a conveyor belt 1 of the storage place conveyor. Above said storage place conveyor, there is movably arranged the transfer device having a gate-shaped framework 2 which is movable on two rails 3 located on both sides of the storage place conveyor. A supporting ring 4 is, by means of a ball ring 5, rotatable about a vertical axis 6, said supporting ring 4 being located on the gate-shaped frame 2. A pouring funnel 7 which is mounted in the gate frame 2 extends upwardly through the ball ring 5 and the supporting ring 4. On both sides of said supporting ring 4, stands 8 are mounted on the supporting ring 4. The rearward end of the belt bridge 9 is, by means of joint bolts 10, mounted or journaled on said stands 8, said joint bolts having a horizontal axis extending transverse to the longitudinal direction of the bridge.

In the belt bridge 9 which may be a framework construction, the reloading belt extends at the level of the lower chord of the bridge main girder. The rearward reversing drum 12 of the reloading belt 11 is so arranged that the pourable material which passes above the reversing drum 12 drops in a discharged jet in close vicinity of the axis 6 into the pourable funnel 7. The front reversing drum 13 of the same belt is arranged at the front end of the belt bridge 9. A chute 15 is arranged above that charging section of the reloading belt 11 which is adjacent to the reversing drum 13 while at said charging section there are provided charging rollers 14 which are loaded below the upper chord, said charging rollers 14 being located closely adjacent to each other. The material laterally being discharged from the bucket wheel 16 mounted on the belt bridge is conveyed to the reloading belt 11. At the front end of the belt bridge 9 there is provided a scraper 17 which extends from the lower chord at an inclination in upward direction, which inclination equals the inclination of the slope of the dump 18 to be picked up.

Figure 2:
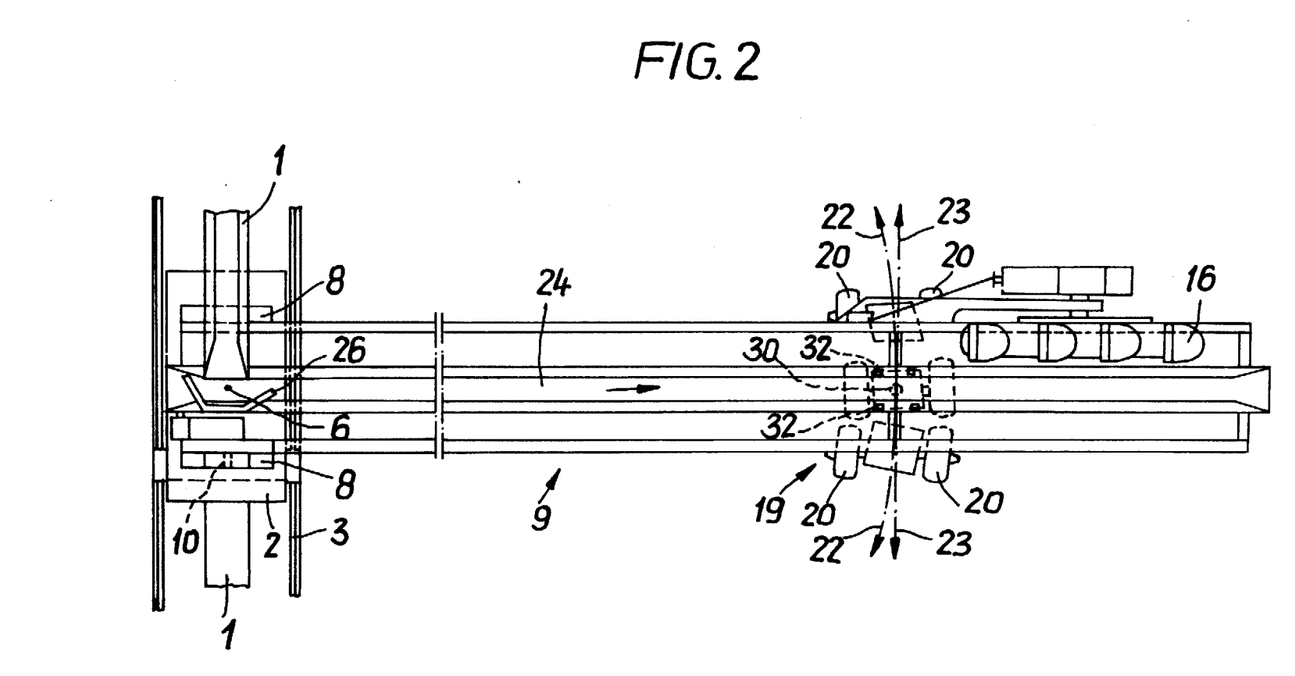
FIG. 2 is a top view of the arrangement of FIG. 1.

The belt bridge 9 rests closely behind the bucket wheel 16 on a carriage 19 which has three pairs of rubber tires 20, by means of which it drives on the planum 21 of the storage place. All or only a part of the wheels 20 may be driven. At least the wheels at the ends of the carriage may be pivotable for steering purposes. FIG. 2 shows that the wheels at the ends of the carriage are so pivoted that the carriage moves along a circle 22, the center point of which is located in the vertical axis of the transfer device. In conformity therewith, the bucket wheel 16 will pick up or reduce the dump 18 in block operation. In this connection, the belt bridge 9 is, while taking advantage of the rotatable journaling of the supporting ring 4, pivoted on the ball ring 5, back and forth, while the transfer device means for a period of time on the rails 3. However, it is also possible that the reloading device operates in step operation. In such an instance, the wheels are directed at a right angle to the longitudinal direction of the belt bridge 9 so that the carriage 19 moves in conformity with the arrows 23 in FIG. 2 parallel to the storage place conveyor while the transfer device 2, 4 moves at uniform speed on the rails 3.

Furthermore mounted on the belt bridge is a loading belt 24 which extends at the level of the upperchord of the main girder and extends over the entire length of the main girder. The front reversing drum 25 of the main girder projects considerably beyond the bucket wheel 16 so that the pourable material is dropped in a jet at sufficient height onto the dump 18. Above the charging section of the loading belt 24, on the belt bridge 9 there is provided a chute 26 for receiving the pourable material which by the conveyor belt 1 is discharged by means of a discharge drum 27 forming a belt loop. The belt loop is supported by a belt loop carriage which is coupled to the gate-shaped frame 2 and which is likewise movable on the rails.

The support of the belt bridge 9 on the carriage 19 is effected as follows:

On the frame 28 of the carriage, in the center thereof there is a rocker 29 journaled in one-point joint 30. This joint 30 may be formed by a ball and a ball calotte or by a pot bearing with an elastic filling.

The rocker 29 has its top side provided with a plate 31 on which two pairs of supporting rollers 32 are mounted. On said supporting rollers 32 there rest two supporting rails 33 which by rims on the supporting rollers 32 are secured against slipping off laterally. The supporting rails 33are 33 are at the bottom side of a rocker 34 which is mounted on the belt bridge 9 between the lower chords of the main girder by means of joint bolts 35 with the axis thereof extending transverse to the longitudinal direction of the bridge. Both ends of the rocker 34 are engaged by two hydraulic power operable devices, the cylinders 36 of which are mounted on the belt bridge by means of joint bolts 37, the axes of which, are likewise located transverse to the longitudinal direction of the bridge.

Figure 1:
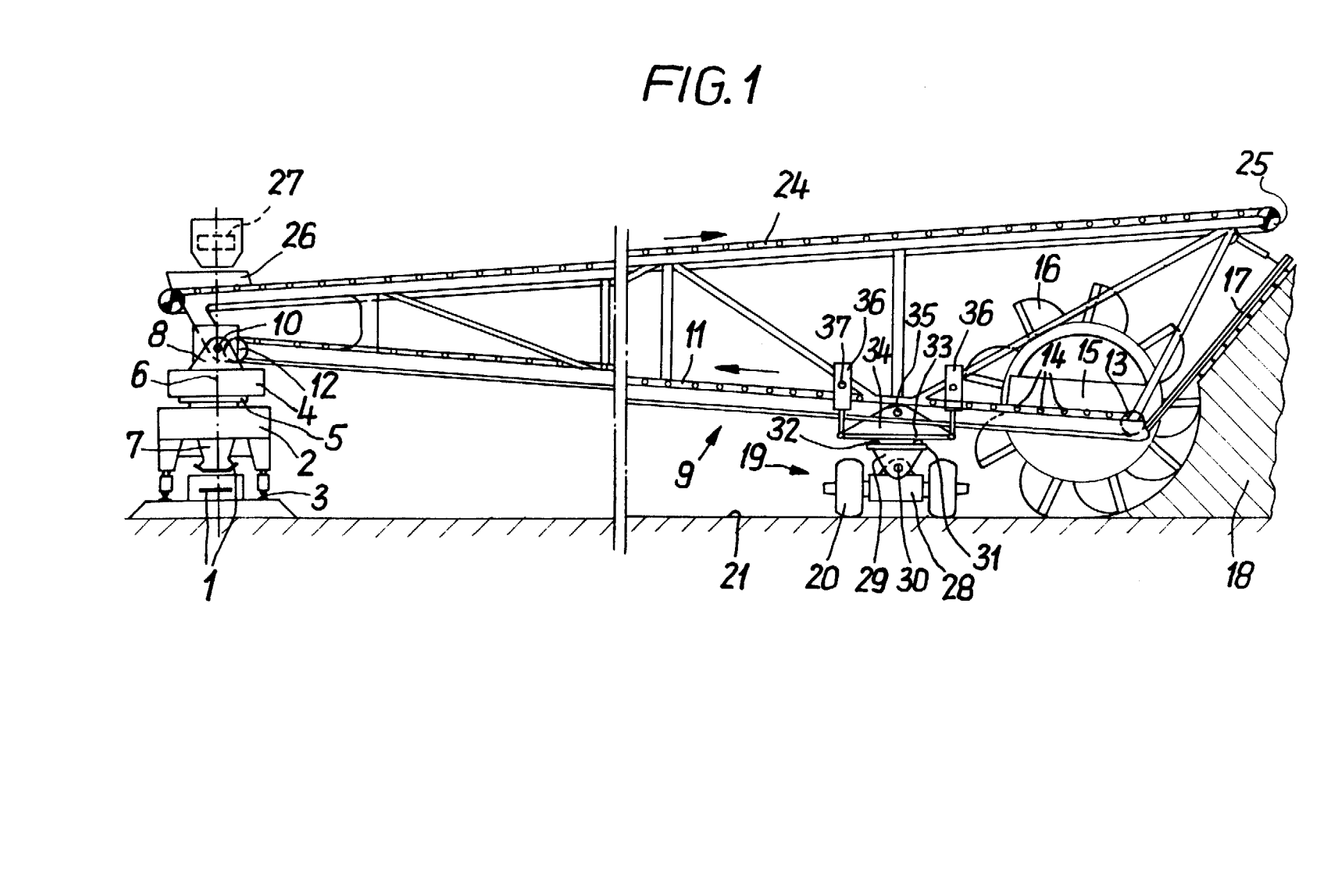
FIG. 1 illustrates a side view of a reloading device with a transfer device.

FIG. 1 shows that the rocker 34 is, by means of the hydraulic power operable devices 36, so adjusted that the supporting rails 33 extend horizontally. When the distance of the center of the carriage 19 from the center of the transfer device 2, 4 changes, for instance, when the carriage 19 moves in conformity with the arrows 23 parallel to the storage place conveyor while the transfer device 2, 4 is at a standstill, the support of the belt bridge on the carriage 19 is able easily to adapt itself to said change in distance by said supporting rails 33 rolling on said supporting rollers 32.

Figure 3:
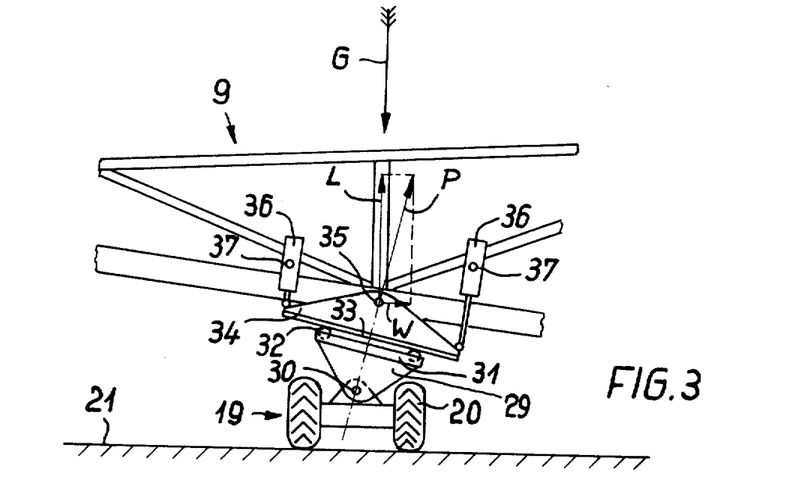
FIGS. 3 and 4 respectively illustrate a cutout of FIG. 1 with two different adjustments of the rocker shown in FIG. 1.

When the bucket wheel picks up pourable material from the foot of the dump, which material has been loosened by the scraper 17 from the dump 18, the scraping forces occurring in connection therewith generate reaction forces which act upon the belt bridge 9. The components of these scraping forces which are approximately horizontal have the tendency to move the belt bridge 9 toward the rear. In order to prevent an undue high tilting moment being exerted thereby upon the transfer device 2, 4, the rocker 34, as shown in FIG. 3, is, by actuating the hydraulic power operable devices 36 in opposite direction with regard to each other, tilted in such a way that the supporting rails will be inclined downwardly in the direction toward the dump 18. Consequently, from the rocker 29 of the carriage 19 a supporting force P acts upon the rocker 34 in the center of the joint bolts 35, said supporting force P deviating correspondingly from the vertical plane. The supporting force P is so great that its vertical component L balances that portion G of the weight of the belt bridge which is effected at said spot. The corresponding horizontal component W of the supporting force P is directed forwardly so that it acts in a direction counter to the horizontal component of the reaction force originating with the bucket wheel 16. It is possible to impart upon the rocker 34 such an inclination that the horizontal component W of the supporting force P of the horizontal component more or less balances the reaction force originating with the bucket wheel 16 so that the transfer direction 2, 4 is relieved to a corresponding extend from the reaction force.

Figure 4:
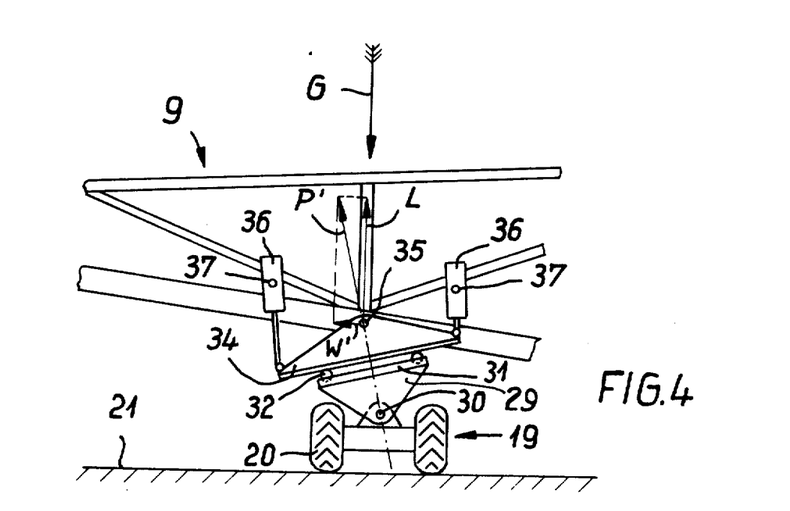

FIG. 4 shows that the rocker 34 has been pivoted in opposite direction to that shown in FIG. 3. This may be the case when the reaction force originating with the bucket wheel 16 is directed toward the belt bridge 9 in the direction toward the dump 18. The corresponding horizontal component is, in conformity with FIG. 4, counteracted by the opposite component W' of the corresponding supporting force P.

The hydraulic power devices 36 may under certain circumstances also be employed for lifting the front end of the belt bridge 9 if it should be desired that the bucket wheel 16 engages the dump 18 at greater height. In such an instance, it would be necessary that the rocker 34 is mounted on the belt bridge 9 by means of joints slidably guided in the direction of height.

The relief of the transfer device makes it possible that the carriages of the gate-shaped frame 2 will obtain smaller dimensions than heretofore. Expediently, the pivoting of the rocker 34 into that inclined position which corresponds to the respective reaction force out of the bucket wheel 16, is effected automatically. To this end, a checking device is provided at the rear end of the belt bridge 9. This checking device ascertains what force is respectively exerted by the belt bridge 9 upon the transfer device 2, 4. When this force reaches a predetermined value which must not be exceeded in order not to endanger the stability of the device or implement, a pulse is conveyed to a control device for the hydraulic power operable devices 36 in such a direction that the rocker 34 is pivoted into that position in which the carriage 19 will absorb a sufficient portion of the reaction force acting in approximately horizontal direction and originating with the bucket wheel 16.

Figure 5:
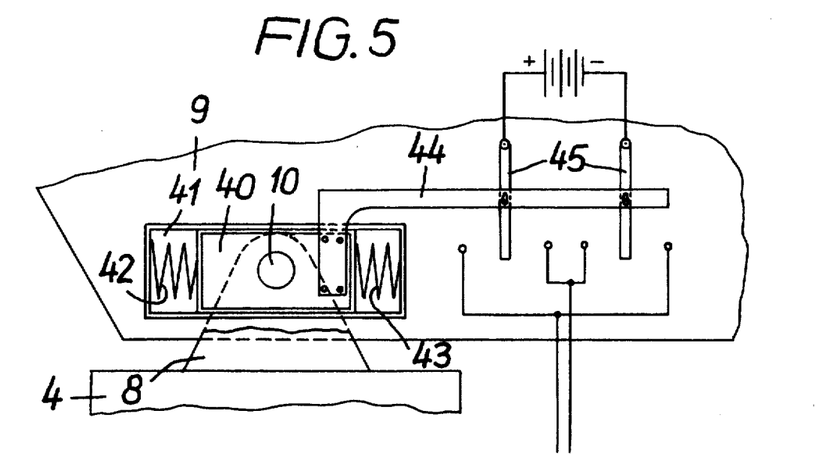
FIGS. 5 and 6 show an embodiment of a checking device in a normal situation.
Figure 6:
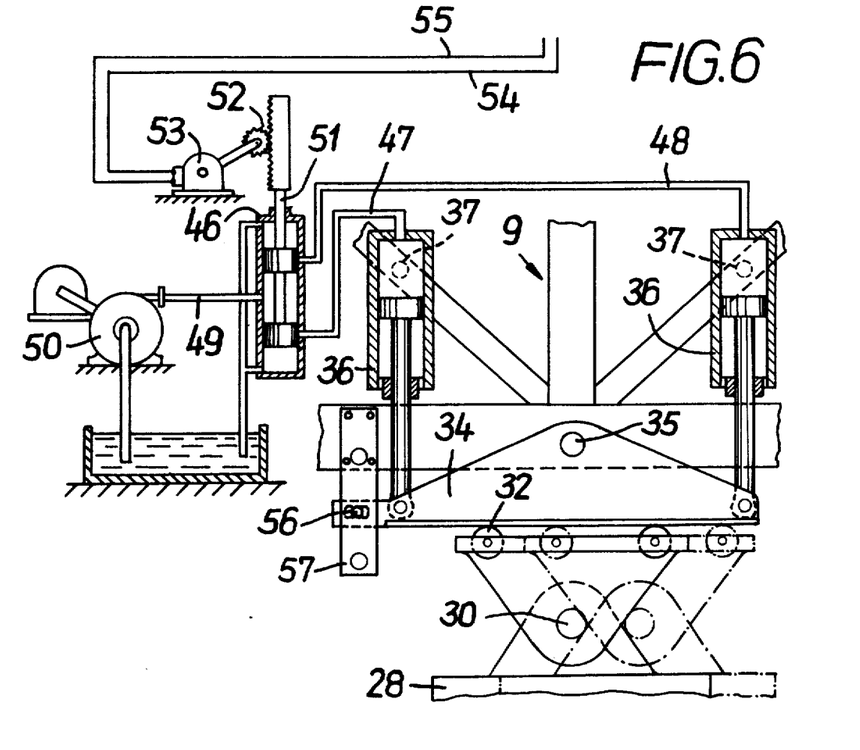
Figure 7:
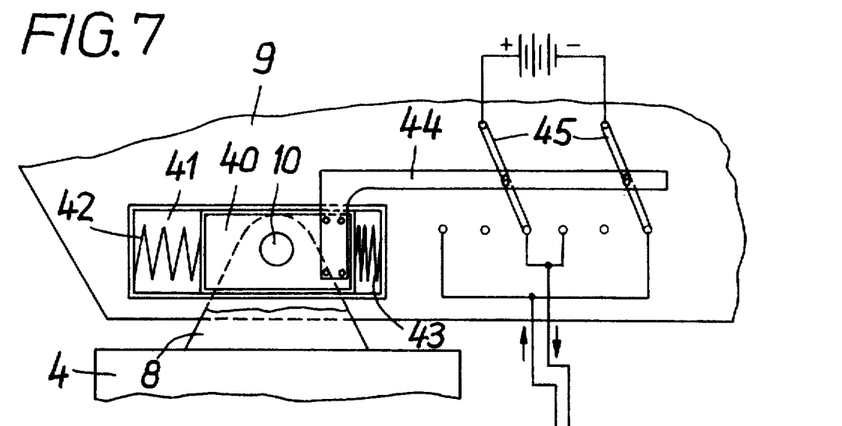
FIGS. 7 and 8 show the checking device in modified positions.
Figure 8:
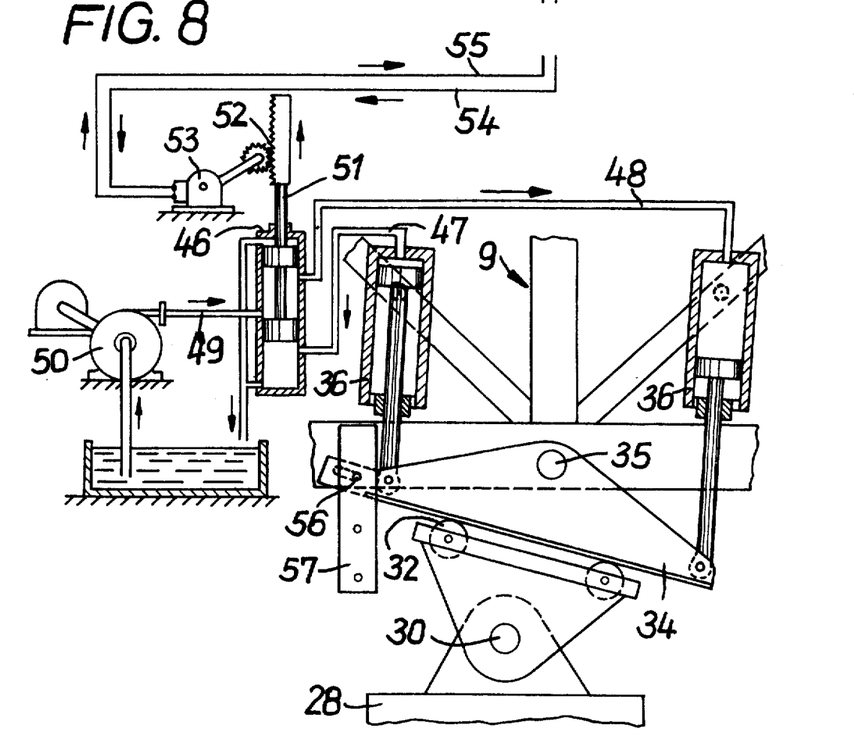

FIG. 5 and 7 show an example of an embodiment of said checking device including at each side of the belt bridge 9 a block 40 which is journalled by bolts 10 on stands 8 and is shiftable in a slot 41 of bridge 9 between two preloaded pressure springs 42, 43. An arm 44 fixed to the block 40 is connected to a reversing switch 45 attached to bridge 9. Cylinders 36 are connected by oil pipes 47, 48 to a two-way slide valve 46 which is connected to the pressure pipe 49 of a pump 50. The slide 51 of slide valve 46 is drivable by a gear 52 and an electric motor 53 which is connected to the reversing switch 45 by two conduits 54, 55. FIG. 5 and 6 show the normal situation. When the force which is exerted by bridge 9 to transfer device will compress spring 43 at a certain rate the reversing switch 45 is switched into position of FIG. 7. Thus motor 53 will shift the slide 51 in the position of FIG. 8 and by means of pressure oil delivered by pump 50 rocker 34 will be turned into position shown in FIG. 8. In this position rocker 34 may be arrested by bolt 56 plugged into a bore which is in a plate 57 fixed to bridge 9. In the normal position according to FIG. 6 bolt 56 is plugged into another bore of plate 57.

Figure 9:
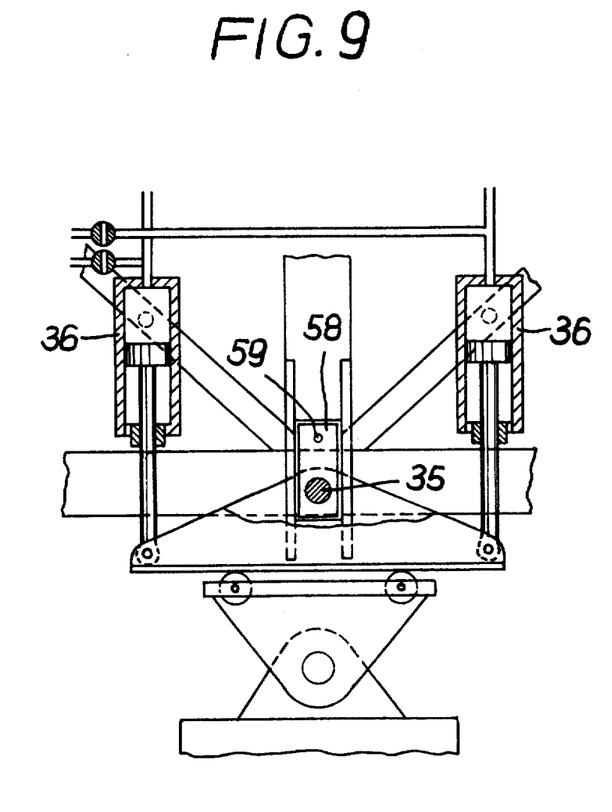
FIGS. 9 and 10 show means for lifting a front end of a bridge.
Figure 10:
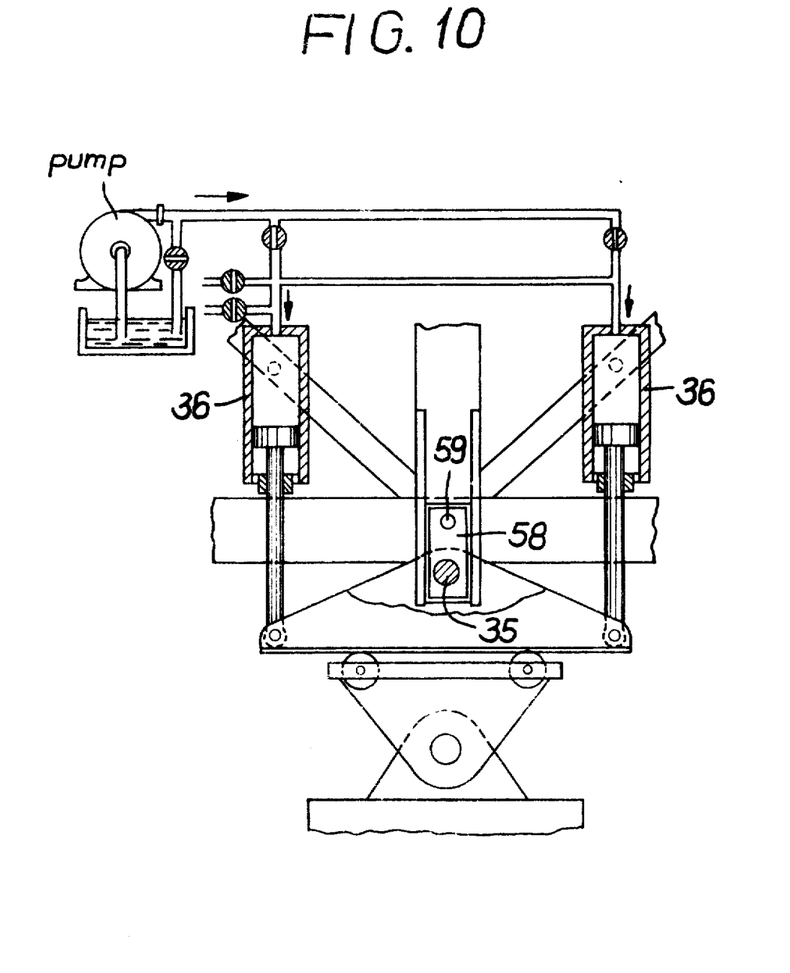

FIG. 9 and 10 show means for lifting the front end of bridge 9 (page 8 lines 17 to 22). Rocker 34 is journalled by bolt 35 on a slide 58 which is guided vertically on an upright of bridge 9 and can be fixed to this upright in different levels by plug 59.

Figure 11:
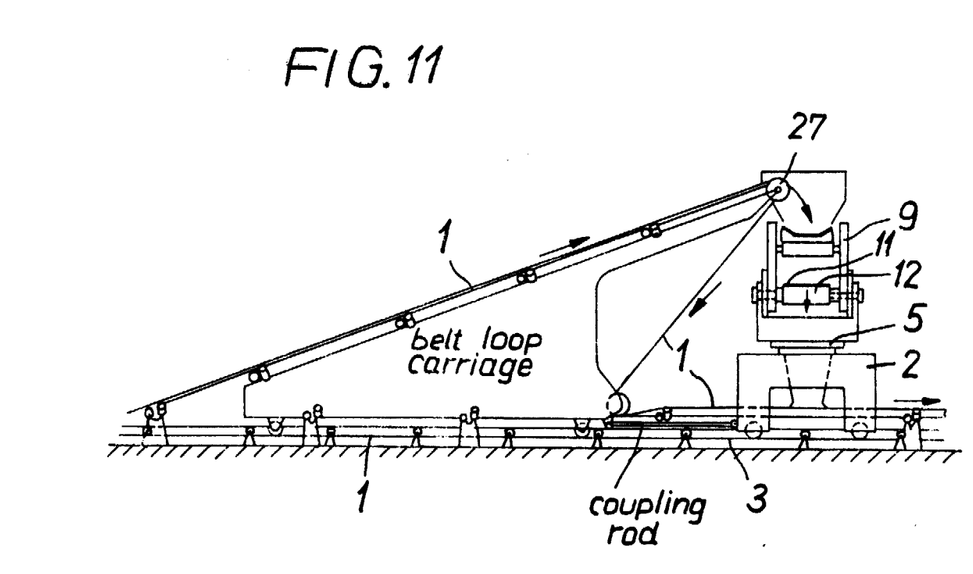
FIG. 11 is a front view of the transfer device of FIG. 1.

FIG. 11 is a front view of the transfer device with the belt loop carriage mentioned on page 6 lines 6 to 8.

It is, of course, to be understood that the present invention is, by no means, limited to the specific showing in the drawings, but also comprises any modifications within the scope of the appended claims.

What we claim is:

1. A reloading device which includes in combination: a belt bridge having a longitudinal direction, pick-up means supported by said belt bridge for picking up pourable material from a dump, a storage place conveyor, a transfer device movable over said storage place conveyor, said belt bridge resting on said transfer device, joint means whereby said belt bridge is pivotable relative to said transfer device about a vertical axis and about an axis transverse to the longitudinal direction of said bridge, carriage means supporting said belt bridge, first rocker means interposed between said carriage means and said belt bridge for supporting said belt bridge on said carriage means and pivotally connected about a transverse axis to said belt bridge, supporting rail means attached to said first rocker means mounted on said belt bridge and extending in the longitudinal direction of said belt bridge, roller means upon which said supporting rail means rest, second rocker means supporting said roller means and pivotally connected to said carriage means on a transverse axis, and means for angularly adjusting said supporting rail means relative to said belt bridge at such variable inclinations relative to the longitudinal direction of said belt bridge that the reaction force component acting approximately in the longitudinal direction of said belt bridge and originating in said pick-up means may be at least partially transferred to said carriage means.

2. A reloading device which includes in combination: a belt bridge having a longitudinal direction, pick-up means supported by said belt bridge for picking up pourable material from a dump, a storage place conveyor, a transfer device movable over said storage place conveyor, said belt bridge resting on said transfer device, joint means whereby said belt bridge is pivotable relative to said transfer device about a vertical axis and about an axis transverse to the longitudinal direction of said bridge, carriage means supporting said belt bridge, rocker means interposed between said carriage means and said belt bridge for additionally resting said belt bridge on said carriage means, supporting rail means mounted on said belt bridge and extending in the longitudinal direction of said belt bridge, roller means supported by said rocker means and supporting said belt bridge, said supporting rail means being mounted on said belt bridge, bolt means whereby said supporting rail means is pivotable about an axis transverse to the longitudinal direction of said belt bridge, means for arresting said supporting rail means relative to said belt bridge at such variable inclinations relative to horizontal direction that the reaction force component acting approximately in the longitudinal direction of said belt bridge and originating in said pick-up means is always at least partially transferred onto said carriage means, and power operable means associated with said rocker means for pivoting said supporting rail means, said power operable means also being operable to lift said belt bridge relative to said carriage means.

3. A reloading device in combination according to claim 2, which includes monitoring means for automatically pivoting said supporting rail means in response to forces originating with said pick-up means and respectively acting upon said transfer device approximately in the longitudinal direction of said belt bridge.

* * * * *